March 12, 1963     W. A. COLBURN     3,081,033

TEST UNIT

Filed Jan. 29, 1959

INVENTOR.
WILLIAM A. COLBURN

ATTORNEYS

United States Patent Office 3,081,033
Patented Mar. 12, 1963

3,081,033
TEST UNIT
William A. Colburn, Denver, Colo., assignor to Petroleum Research Corporation, Denver, Colo., a corporation of Colorado
Filed Jan. 29, 1959, Ser. No. 789,903
7 Claims. (Cl. 235—184)

This invention relates to the study of the flow characteristics of compressible fluids through resistive paths such as oil reservoir sands or the like and particularly to an improved electric analog model for such studies and to a method of making such models.

In order to study the characteristics of the flow of compressible fluids through bodies affording resistance paths it has become the general practice to employ various types of models of the bodies to be studied. All types of flow obey the same general equations and it is convenient to employ electric analog models to solve fluid flow problems. For example, in the electric analog models of porous media reservoirs such as natural oil bearing reservoirs the conductivity of electrical resistors represents the permeability of the reservoir and the characteristics of electrical capacitors may be employed to represent the effective porosity and compressibility. A single resistor may represent the permeability of a zone under examination and a single capacitor the effective porosity and compressibility. This type of analog model is known as a lumped-unit model and has been employed with substantial success in the study of petroleum reservoir sands.

A lumped-unit model requires a multitude of electrical components in order to simulate the necessary details of petroleum reservoirs; these components are not available for the making up of other analog models until the tests of the first model have been completed. Thus vast numbers of electrical components may have to be employed where several studies are being carried on concurrently, and these models tie up large quantities of equipment and are costly. Furthermore, the setting up and adjusting of a lumped-unit model is laborious and expensive. Accordingly it is an object of this invention to provide an improved electric analog model for the study of the characteristics of the flow of fluids through resistance paths.

It is another object of this invention to provide an improved electric analog model for the study of petroleum reservoir sands.

It is another object of this invention to provide an improved electric analog model of simple construction and which is inexpensive to make.

It is another object of this invention to provide an improved distributed capacitor.

It is still another object of this invention to provide an improved combined distributed capacitance and distributed resistance.

It is a still further object of this invention to provide an improved method for making electric analog models of petroleum reservoirs.

Briefly, in carrying out the objects of this invention in one embodiment thereof an electric analog model of a petroleum reservoir is constructed by coating a metal plate with a very thin layer of dielectric and then painting over the dielectric layer of a series of bands or strips of conducting paint-like material each representing a zone or section of the reservoir; each band is selected to have its conductivity of a value to be proportional to the transmissibility of the reservoir sand and the capacitance is selected to be proportional to the effective porosity of the reservoir and the compressibility of the reservoir fluids. The term "transmissibility" as here used refers to the product of the permeability of the reservoir sand and its thickness. By applying electric potentials to the model thus formed which are proportional to fluid potentials of the reservoir, pressure distribution and flow characteristics of the reservoir may be determined by measuring the electrical potential and current at selected points in the model.

In another embodiment a three-dimensional model is constructed by compacting a mass of metal particles, preferably in the form of shot, so that the entire mass is electrically conducting. The shape of the mass is made to conform to the shape of the reservoir. The compacting of the metal particles leaves voids throughout the mass which are in continuous communication and the surfaces of the particles throughout the mass are then coated with a dielectric by cataphoresis or by introducing a solution of a synthetic resin in a suitable solvent so that the resin and solvent fill the voids and coat all the surfaces of the particles exposed to the voids as well as the external surfaces of the compacted mass. The solution is drained from the voids leaving a layer covering all the surfaces and the solvent is then evaporated leaving a thin coating of the resin on the surfaces of the particles throughout the mass or by any other means. The shot mass provides one plate of the capacitor and the second plate is formed by introducing a conducting material in the form of a paint-like substance into the voids so that they are filled with the conducting material. The coating of resin provides the dielectric between the two plates.

The three-dimensional analog model constructed in this manner comprises a combined distributed capacitor and distributed resistance. In order to determine the flow characteristics through a selected portion of the model, electrical potentials are applied between points at selected spacings in that portion of the model; the current flow, the potential distribution, and the rate of charge and discharge of the capacitor give the required information for each set of points. Petroleum reservoirs normally comprise several layers of petroleum bearing sands each having different characteristics and in making up the analog model each sand is represented by a portion of the model having the same shape in miniature and having the paint-like resistance materials selected to represent the resistance characteristics of the particular layer.

The features of novelty which characterize this invention will be pointed out with particularity in the appended claims. The invention itself, however, both as to its organization and method of operation, will be pointed out in the following specification taken in connection with the accompanying drawings in which:

Figure 1:
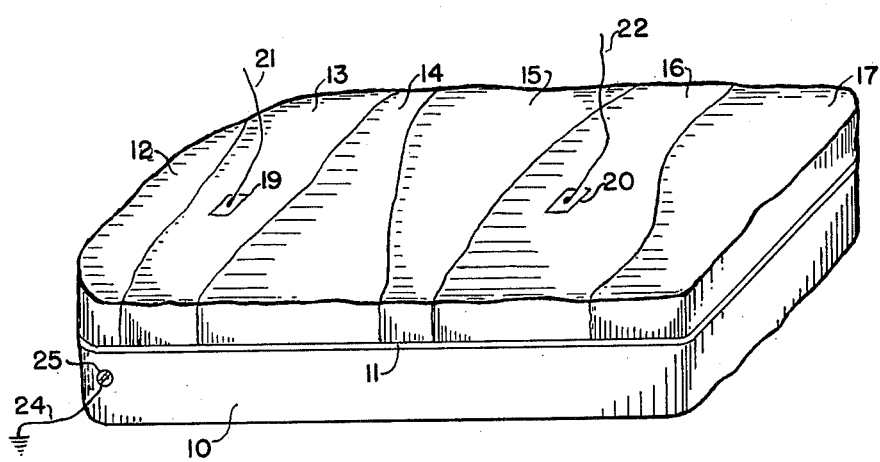
FIG. 1 is a perspective view on an exaggerated scale of an electric analog model illustrating one form of the invention.

Referring now to the drawing, the electric analog model shown in FIG. 1 comprises a metal plate 10 having its upper surface coated with a very thin layer of dielectric material 11 which in turn is coated with a plurality of strips or sections of paint-like electric resistive material 12, 13, 14, 15, 16 and 17. In the drawing the dimensions of the dielectric layer and the sections of paint-like material have been exaggerated for purposes of illustration. In practice the plate 10 is coated with a very thin dielectric material which may be applied by any suitable method. For example, a synthetic resin may be applied by diluting it with a solvent, coating the plate and then allowing the solvent to evaporate, which leaves a thin film of the resin. Other methods which may be employed, by way of example, are depositing the dielectric by cataphoresis and by anodizing. The paint sections 12–17 are painted on over the dielectric by silk screen techniques or in any other suitable manner and have a thickness of the same order as that secured by conventional painting processes.

The overall form of the model and the relative shape and size of the several sections are selected so that they conform or correspond to parts of a formation to be investigated. The strips 12–17 may, for example, represent a plurality of portions of the reservoir sands in a natural petroleum formation. Not only are the shapes and sizes of the sections 12–17 selected to correspond with their represented portions of the reservoir, but the paint-like material for each section is selected to have an electrical resistance corresponding to the transmissibility of that portion of the reservoir sand represented by the section. The paint-like material may, for example, be made by adding acetylene black to an epoxy resin constituting a paint base in a proportion such that the resistivity of each section bears the required relationship to that of the adjacent sections. The resistance to fluid flow through the sand of each section is thus represented by the electrical resistance of the paint-like material and is a measure of the transmissibility of the sand. The porosity of the reservoir and the compressibility of the reservoir sand and fluids are represented by a distributed capacitor comprising the plate 10 and the resistive paint-like material layers 12 to 17 inclusive separated by the dielectric 11.

If now the characteristics of the reservoir with respect to fluid flow between two points represented say by an electrode 19 and an electrode 20 are to be determined, these electrodes are taped or otherwise securely held in conducting relationship against the resistive material of the sections 13 and 16, respectively, and electrical leads 21 and 22, respectively, are connected to the points 19 and 20 so that the points may be connected to the test apparatus for determining the resistance to the flow of electric current between the points 19 and 20. The tests are performed by applying electric potentials to the points corresponding respectively to the fluid pressure at the points. In addition the metal plate 10 is grounded by a lead 24 connected to the plate in any suitable manner, as for example by a set screw 25, so that the capacity to ground from any selected point on the paint layers 12 to 17, inclusive, may be determined by a capacitance meter or indicating instrument.

With this electric analog model it is thus possible to investigate the effects of various changes in fluid flows through the porous reservoir. For example, the effect on the flow of fluids between the points 19 and 20 which may represent wells in a petroleum reservoir may be determined for various pressures of fluid at the producing well, say the well 19, and furthermore the effect of introducing fluids such as water for flooding purposes at another well, say the well 20, can also be determined. The manner in which these studies are conducted is well known in the prior art wherein lumped circuits have been provided heretofore which comprise networks of resistances representing the various transmissibilities of the reservoir and capacitances connected between the junctures of the resistances and ground represent the porosity of the reservoir and the compressibility of the reservoir fluids.

This essentially two-dimensional electric analog model may be employed for the accurate determination of the characteristics of fluid flow and reservoir formation wherein the several sections of the reservoir structure are of substantially the same thickness. Most petroleum reservoir sands, for example, vary both in permeability and thickness from point to point. In the study of such structures the electric analog model should provide resistance and capacitance values distributed throughout a three-dimensional model. A three-dimensional model for facilitating the study of porous reservoirs having non-uniform dimensions throughout their structure is illustrated in FIGS. 2 and 3.

Figure 2:
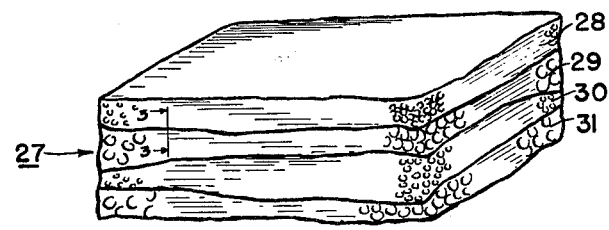
FIG. 2 is a perspective view of another embodiment of the invention.

The electric analog model illustrated in FIG. 2 has been shown as a generally block-shaped body 27 comprising a plurality of layers 28, 29, 30 and 31, each representing in thickness and conformation a respective section of a petroleum reservoir formation. Each of the layers 28 to 31, inclusive, constitutes a combined distributed capacitance and distributed resistance, the capacitance being representative of the porosity and compressibility of the reservoir structure and fluids and the resistance being representative of the permeability of the reservoir.

Each of the layers 28 through 31 preferably comprises a mass of uniform sized small bodies of spherical or shot-like particles, of a metal having good electrical conductivity. The individual metal bodies in the mass are compacted so that they are in electric conducting relationship with one another and after this contact has been established are coated with a very thin layer of dielectric material thus covering all surfaces except those in direct contact. The dielectric may be applied by any suitable technique, for example by immersing the compacted body of shot-like particles in a solution of synthetic resin and a suitable solvent, drawing out the excess solution leaving a coating on the surfaces of the particles, then preferably subjecting the entire body with the solvent coating therein to a vacuum to remove bubbles and evaporate the solvent. This leaves a thin layer of impervious dielectric material surrounding the conducting shot but leaving continuous voids between the shot. After the dielectric layer has been formed and hardened or cured, the voids within the mass of shot are filled with a material such as the paint-like material employed in the modification of FIG. 1, and again it is preferable to employ a vacuum process to assure the elimination of gas bubbles within the compacted body of shot.

Figure 3:
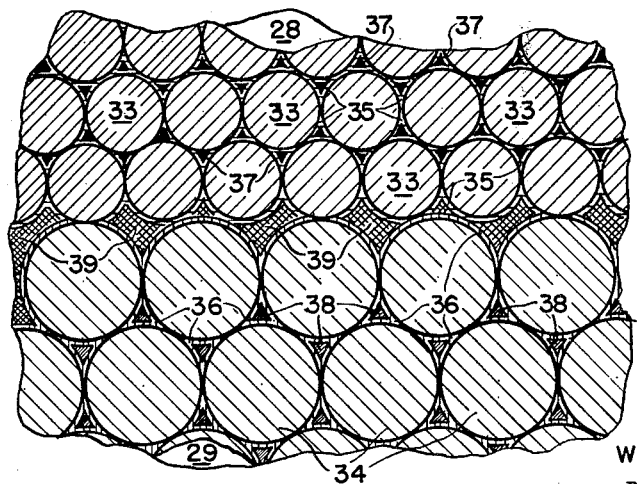
FIG. 3 is a greatly enlarged detail sectional elevation view of a small portion of the embodiment of FIG. 2 taken along the line 3—3 thereof.

FIG. 3 illustrates in section the arrangement of the shot in a small portion of the analog model of FIG. 2, the shot being greatly magnified in order to show the dielectric and the fillings of resistive material and the sections being assumed to pass through the centers of all the spherical particles, the two layers or formations being indicated at 28 and 29. The layer 28 comprises a plurality of spherical shot 33 massed together and compacted so that they are in conducting relationship with one another, and the layer 29 comprises a mass of similar but larger metal particles or shot 34 also compacted so that they are in conducting relationship with one another. These layers may be formed separately to the required configuration and then placed together after each has been completed, the section 28 having a coating of dielectric 35 about the shot 33 therein and the section 29 a similar coating 36 about the pellets or shot 34 therein. The layers 35 and 36 are very thin and appear in exaggerated thickness for purposes of illustration in FIG. 3. Layer 28 is then filled with a resistive paint-like material 37 and the layer 29 with a similar resistive paint-like material 38, the resistive material in each case entirely filling the voids surrounding the shot 33 and 34, respectively. The relative size of the shot 33 and 34 is selected so that it will provide the proper surface area and therefore proper capacitance and also so that the pores are large enough to permit the paint to be placed therein; and the paint-like materials 37 and 38 of the two reservoirs are selected, respectively, to have resistivities corresponding to the permeability of the reservoir sands of the sections 28 and 29 as determined by well test data.

After the two layers have been completed they are bonded together, the space therebetween being filled with a thin layer of paint-like material 39 which may be one or the other of the two materials 37 and 38. The metal bodies of the four layers 28, 29, 30 and 31 are connected electrically so that they may all be maintained at ground potential. It will now be apparent that by providing suitable electrodes at any points within the body 27 the electrical flow characteristics may be determined so that the fluid flow characteristics of the corresponding reservoir may be studied. The necessary electrodes for the test preferably, but not necessarily, are incorporated in the model during its construction.

This electric analog model provides both distributed resistance and distributed capacitance throughout three-dimensional space which may, for example, correspond to the three-dimensional structure of a petroleum reservoir. Details of the reservoir may be represented with a high degree of accuracy and this may be done without tying up large numbers of costly electrical components as is necessary with the present-day lumped circuit models. The analog model of this invention is relatively inexpensive and is easily constructed to a high degree of accuracy in accordance with data such as that secured from well logs, drill stem tests, pressure build-up curves and other available information. These inexpensive models may be kept in storage for a long period of time without tying up expensive electrical components and make it feasible to maintain a large number of models without undue expense.

The paint-like electric resistance materials referred to herein are, of course, electrically conducting; however, in applications where distributed capacitance alone is required it may be desirable to employ a highly conductive or relatively low resistance filling material. The noble metals which do not form oxides may be employed for this purpose; for example, a paint-like material made by mixing powdered silver in an epoxy resin may be employed to provide a second capacitor plate.

The metal plates or particles employed in making the analog models have high electrical conductivity and have a negligible effect on the readings obtained to determine the flow characteristics of the reservoir.

While the invention has been disclosed in connection with specific forms of electric analog models, various other applications and modifications will occur to those skilled in the art; therefore it is not desired that the invention be limited to the specific details illustrated and described, and it is intended by the appended claims to cover all modifications which fall within the spirit and scope of this invention.

I claim:

1. An electric analog model for the determination of the pressure distribution and flow characteristics of a fluid reservoir and wherein the transmissibility is represented by the electrical resistance and the effective porosity of the reservoir and the compressibility of the reservoir fluids are represented by electrical capacitance, which comprises an electrical conducting body having a surface area of the same shape as an area of the reservoir to be studied, a thin layer of dielectric material covering said surface area, a layer of electrical resistance material coating said dielectric layer and separated from said body thereby, and electrode means for establishing contacts with any selected pair of points on said electrical resistance layer whereby the resistance and capacitance between said points may be measured and the pressure and fluid flow characteristics between said points may be determined.

2. An electric analog model as set forth in claim 1 wherein said layer of electrical resistance material comprises a plurality of coatings each on a separate portion of said surface area and in conducting relationship with one another along their adjacent boundaries, each of said coatings having an electrical resistance corresponding to the transmissibility of its respective portion of the reservoir.

3. An electric analog model for the determination of the pressure distribution and flow characteristics of a fluid reservoir and wherein the transmissibility is represented by the electrical resistance and the effective porosity of the reservoir and the compressibility of the reservoir fluids are represented by electrical capacitance, which comprises an electrical conducting plate shaped to the configuration of the reservoir area, a dielectric coating on one side of said plate, a plurality of coatings of conducting materials covering adjacent areas of said dielectric coating, each of said plurality of coatings representing the area of its respective zone of the reservoir and having edge contact with an adjoining coating, and each of said coatings having an electrical resistance representing the transmissibility of its respective zone of the reservoir, and electrode means for establishing contacts with any selected pair of points on said coatings of conducting material whereby the resistance and capacitance between said points may be measured and the pressure and fluid flow characteristics between said points may be determined.

4. An electric analog model for representing a plurality of characteristic values which comprises a mass of metallic particles compacted to form a body of the required size and shape and having intercommunicating voids between said particles with the particles in conducting engagement with one another, a thin coating of dielectric material covering the exposed surfaces of said particles within said body, and a mass of electric conducting material filling the voids within said body and separated from said particles by said dielectric coating whereby said particles and said conducting material provide the plates of a capacitor separated by said dielectric material and said body constitutes a distributed capacitance representing a first characteristic value, said electric conducting material having a resistance representing a second characteristic value thereby providing a three-dimensional distributed resistance whereby said model provides an analog for values represented both by electrical capacitance and resistance.

5. An electric analog model as set forth in claim 4 wherein said body is shaped to the conformation of a fluid reservoir to be investigated whereby the resistance provides a measure of the permeability of the reservoir and the capacitance a measure of the porosity of the reservoir and of the compressibility of the reservoir fluid.

6. An electric analog model for the determination of the pressure distribution and flow characteristics of a fluid reservoir and wherein the permeability is represented by the electrical resistance and the effective porosity of the reservoir and the compressibility of the reservoir fluids are represented by electrical capacitance, which comprises a plurality of masses of metallic particles compacted to form a continuously conducting body having continuous voids between the particles thereof, thin continuous coatings of dielectric material covering the exposed surfaces of the particles in each of said masses and conducting material filling the voids in said masses whereby each of said masses constitutes a distributed capacitor and whereby said conducting material provides continuous conducting paths throughout said masses and constitutes a distributed resistance.

7. An electric analog model for analyzing pressure distributions and flow characteristics of an oil reservoir and wherein the permeability is represented by electrical resistance and the effective porosity and the compressibility of the reservoir fluids are represented by electrical capacitance which comprises a plurality of masses of electrically conducting particles each compacted to form a continuously conducting body having continuous voids between the particles, each of said bodies conforming in shape and relative size to a predetermined respective portion of the reservoir structure to be examined, the exposed surfaces of said particles being coated with a continuous thin layer of dielectric material, and said voids being filled with an electric resistance material representing the permeability of the respective portions of the reservoir, and said body constituting a distributed capacitor representing the effective porosity and the compressibility of the reservoir fluids, and said resistance materials of respective reservoirs being in electrical conducting relationship whereby continuous conducting paths are provided throughout said model.

References Cited in the file of this patent

UNITED STATES PATENTS

| | | |
|---|---|---|
| 2,111,710 | Van Loon | Mar. 22, 1938 |
| 2,126,915 | Norton | Aug. 16, 1938 |
| 2,299,228 | Gray et al. | Oct. 20, 1942 |
| 2,472,464 | Bruce | June 7, 1949 |

OTHER REFERENCES

Geophysics, volume XX, No. 4, October 1955; pages 860–870, "A Low Frequency Earth Model" by William C. Pritchett.

British Journal of Applied Physics, volume 9, April 1958; pages 144–148, "An Electrical Analogue Method of Predicting the Permeability of Unsaturated Porous Materials" by M. C. Probine.